United States Patent [19]

Amphlett

[11] 3,767,211
[45] Oct. 23, 1973

[54] GASKETS
[75] Inventor: Philip Harold Amphlett, Lincoln, England
[73] Assignee: Jointine Products Company Limited, Lincoln, Lincolnshire, England
[22] Filed: Nov. 16, 1971
[21] Appl. No.: 199,202

[30] Foreign Application Priority Data
Nov. 25, 1970 Great Britain.................... 56,123/70

[52] U.S. Cl............................ 277/1, 117/4, 117/13, 117/16, 117/26, 117/33, 117/68, 156/283, 156/309, 156/313, 161/162, 161/DIG. 5, 277/227, 277/DIG. 6
[51] Int. Cl............................ F16j 15/14, B44d 1/09
[58] Field of Search....................... 161/DIG. 5, 162, 161/168; 117/16, 26, 76 T, 76 F, 72, 75, 100 C, 122 H, 122 PA, 122 PF; 277/1, DIG. 6, 227; 156/283, 309, 313

[56] References Cited
UNITED STATES PATENTS
2,116,000 5/1938 Peterson........................... 117/72 X
3,485,132 12/1969 Hanny et al..................... 117 75 X/
3,639,137 2/1972 Marinelli............................. 117/26
3,524,794 8/1970 Jonnes et al..................... 161/162 X
2,988,460 6/1961 Eichel............................. 117/122 H
3,467,544 9/1969 Marinelli et al................. 117/100 C
3,230,290 1/1966 Nelson et al..................... 156/309 X Primary Examiner—Ralph Husack
Attorney—John P. Snyder et al.

[57] ABSTRACT

A gasket for effecting a liquid and/or a gas tight seal between two surfaces has at least one of two opposite surfaces coated with pressure-rupturable microcapsules containing a liquid sealing composition. The capsules are ruptured by compression of the gasket between the two surfaces and the liquid sealing composition then hardens to form the seal. The sealing composition may consist of natural rubber, polyisoprene, polybutadiene, polybutadiene-styrene copolymer, polybutadiene-acrylonitrile copolymer, polychloroprene, or a polysulphide, or the composition may consist of a polyester, a polyamide, an epoxy resin, an alkyd resin, a modified phenol-formaldehyde resin, a modified urea-formaldehyde resin, a modified melamine-formaldehyde resin, a drying oil, or cashew nut oil.

5 Claims, No Drawings

GASKETS

BACKGROUND OF THE INVENTION

1. Field of the Invention

This invention relates to gaskets.

Throughout this specification the word "gasket" is used to denote a member adapted to be compressed between two surfaces to provide a liquid and/or gas tight seal between the surfaces.

2. Description of the Prior Art

Gaskets are frequently used between flanges on two metal members which are to be secured together.

In such cases it is usual to interpose a soft, compressible material gasket made, for example, from cork, rubber, asbestos, cellulose or other fibrous material, between the flanges, and to apply pressure to the gasket by tightening nuts on bolts passing through apertures in the flanges and the gasket. The effectiveness of the seal provided by the gasket depends very largely on the degree to which the nuts can be tightened, and to the spacing between the bolts.

It is common practice in the automobile industry to use wide spacing of the bolts securing members between which a gasket is provided, for example, a rocker box cover and a cylinder head, and in certain instances it is not possible to use the most effective spacing of the bolts, for example, in sump or oil pan joints.

The use of known gaskets has a number of disadvantages, a particular disadvantage being that the soft compressible material from which the gasket is made relaxes with time, with consequent loss of tension in the bolts and, therefore, loss of compression of the gasket and a reduction in the effectiveness of the seal.

Furthermore, in order to accommodate irregularities in the surface of the flanges it is sometimes necessary to use a gasket of substantial thickness, for example a gasket ¼ inch thick. If when using such a gasket the nuts are tightened sufficiently to allow for subsequent relaxation, there is the possibility of the gasket being excessively compressed in the region of the bolts, resulting in distortion of flanges and consequent reduction in the effectiveness of the seal.

Another known method of effecting a liquid and/or gas tight seal between two surfaces comprises applying a liquid sealing composition to the two surfaces before urging the surfaces together, the sealing composition subsequently hardening by evaporation of solvent or by chemical action. Often such a sealing composition is used together with a gasket to increase the reliability of the seal. These methods however are not suitable for mass production techniques such as are common in the automobile industry.

A further known method of providing a seal is to apply a heat-sensitive coating to a gasket prior to positioning the gasket between two flanges, and then to apply heat to the gasket after the flanges have been secured together, whereby the heat-sensitive coating softens and conforms to any irregularities in the surfaces of the flanges.

SUMMARY

From the above it is evident that there are several conflicting requirements for a gasket. Firstly, in order to effect a good seal, the gasket must accommodate any irregularities in the surfaces to be sealed. Secondly, the gasket must be hard enough to withstand any pressure to which it is subjected, for example when the nuts are tightened to such an extent that the bolts are stressed sufficiently to maintain tension. A hard material is also desirable in order to avoid loss of tension due to relaxation of the gasket. Thirdly, in order to avoid distortion of the surfaces to be sealed, the gasket should be as thin as possible.

According to one aspect of this invention there is provided a gasket having a surface or surfaces coated with pressure-rupturable micro-capsules containing a liquid sealing composition.

According to another aspect of the invention a method of providing a liquid and/or gas tight seal between two surfaces, comprises the steps of coating a surface or surfaces of a gasket with pressure-rupturable micro-capsules containing a liquid sealing composition; positioning the coated gasket between the two surfaces; and urging the two surfaces together thereby to rupture the micro-capsules and liberate the liquid sealing compositions between the gasket and one or both of the two surfaces.

If necessary subsequent hardening of the liquid sealing composition can be effected either by absorption or evaporation of a solvent of the liquid sealing composition, or by chemical action.

DESCRIPTION OF PREFERRED EMBODIMENTS

The invention makes use of the ability of a liquid sealing composition to conform to any irregularities in the surfaces between which a seal is to be provided, and at the same time provides a gasket capable of being handled in any mass production assembly plant.

Preferably the gasket is formed of flat sheet material having a compressibility of 50 percent or less under a load of 1000 p.s.i. when determined according to the procedure described by the American Societe for Testing and Materials designation F.36, such material having a low degree of relaxation after compression. The gasket may be made from cellulose fibre, asbestos fibre, animal fibre, plastics material, metal, glass fibre or carbon fibre.

The liquid sealing composition may consist of a resin or rubber like material either alone or in a mixture, with or without a solvent. Suitable materials are natural rubber, polyisoprene, polybutadiene, polybutadiene-styrene copolymer, polybutadiene-acrylonitrile copolymer, polychloroprene or a polysulphide.

A particularly advantageous liquid sealing composition can be produced by the oxidation of polybutadiene. The product is a liquid and does not require additional solvent to render it mobile. However, if desired additional solvent can be added to reduce the viscosity of the product. Furthermore, this product can be converted to a solid rubber like material by reaction with amines, amides, and polymers thereof, isocyanates, organometallic compounds, para-toluene sulfonic acid, sulphur, sulphur donating compounds, peroxides, anhydrides, phenol formaldehyde, urea formaldehyde or melamine formaldehyde resins.

Suitable resins for use as the liquid sealing composition are polyesters, polyamides, epoxy resins, alkyd resins, modified phenol-formaldehyde resins, modified urea-formaldehyde resins, modified melamine-formaldehyde resins, drying oils and cashew nut oil.

The liquid sealing composition can be encapsulated to form the required micro-capsules by surrounding globules of the composition with a suitable membrane which can be ruptured by the application of pressure.

Such a membrane can be formed of gelatine and a gum like material or of polyurethane. Techniques for producing such micro-capsules are well known, and will not be described in detail in this specification.

The size of the micro-capsules to be used depends very largely on the use for which the gasket is intended, micro-capsules in the size range 50 to 1000 microns in diameter being generally suitable, the preferred size range however being 100 to 300 microns in diameter.

Gaskets in accordance with this invention can be produced by coating a sheet of suitable material with micro-capsules containing a liquid sealing composition such that the micro-capsules adhere to the material, and then cutting the gaskets from the sheet to the required shape.

Otherwise, gaskets already cut to shape from a sheet of suitable material can be coated by applying micro-capsules containing a liquid sealing composition suspended in a suitable liquid containing a binder material to a surface or surfaces of the gaskets and then drying the gaskets to remove the suspension medium.

Another method is to apply adhesive to a surface or surfaces of a pre-cut gasket and then dust on micro-capsules containing a liquid sealing composition such that they adhere to the adhesive. A protective coating can then be applied on top of the adhered micro-capsules.

A further method is to print adhesive onto a sheet of suitable material over an area having the shape of the required gasket, then dust micro-capsules containing a liquid sealing composition onto the adhesive coated area, and then cut the required gasket from the sheet by cutting out the adhesive coated area.

A still further method is to print micro-capsules containing a liquid sealing composition, suspended in a binder material, over an area having the shape of the required gasket, on a sheet of suitable material, and then cut the required gasket from the sheet.

Gaskets in accordance with this invention can be used to provide an effective seal between two flanges as a result of rupture of the micro-capsules on bolting of the flanges together, with subsequent hardening of the liquid sealing composition either by evaporation of a solvent of the composition, or by absorption of a solvent of the composition into the gasket or into a protective coating provided over the micro-capsules or into a binder material of the composition, or by reaction of the composition with a hardening agent provided outside the capsules.

Two methods of producing gaskets in accordance with this invention will now be described by way of example.

EXAMPLE I

A sheet of cellulose fibre material having of 55 to 60 pounds per cubic foot and a thickness of 15 thousandths of an inch, and having a compressibility of less than 20 percent under a laod of 1000 p.s.i. is coated on one or both of its major surfaces with a solution in toluene of a mixture of butadiene-acrylonitrile and phenol formaldehyde resin, and the toluene then removed by evaporation. Micro-capsules in the size range 100 to 300 microns and containing oxidised polybutadiene are applied to the coating or coatings and those micro-capsules not adhering removed by a gentle jet of air. A plasticised polyvinyl chloride dispersion in water is then applied over the micro-capsules on the sheet, and the water removed by evaporation at a temperature not exceeding 70°C, to form a protective laYer over the micro-capsules to reduce the chance of accidental rupture thereof. Gaskets of the required shape are then cut from the sheet.

EXAMPLE II

Using the method described in Example I, the sheet of material is coated with micro-capsules containing a liquid polysulphide known as LP2 and manufactured by the Thiokol Corporation of America. The micro-capsules are then coated with manganese dioxide which will react with the liquid polysulphide on rupture of the micro-capsules to form a solid, rubber like polymer.

The method of Example I or Example II can be used to coat pre-cut gaskets rather than a sheet for subsequent cutting as described.

I claim:

1. A gasket having a compressibility of 50 percent or less under a load of 1000 p.s.i., when determined by the A.S.T.M. procedure designation F.36, made from a sheet material of cellulose fibre, asbestos fibre, animal fibre, plastics material, glass fibre or carbon fibre, at least one of two opposite surfaces of the gasket being coated with pressure-rupturable micro-capsules containing a sealing composition comprising a resin or rubber-like material which is liquid at normal ambient temperatures.

2. A gasket as claimed in claim 1, in which the liquid sealing composition is selected from the group consisting of natural rubber, polyisoprene, polybutadiene, polybutadiene-styrene copolymer, polybutadiene-acrylonitrile copolymer, polychloroprene and polysulphide.

3. A gasket as claimed in claim 1, in which the liquid sealing composition is oxidised polybutadiene.

4. A gasket as claimed in claim 1, in which liquid sealing composition is selected from the group consisting of polyester, polyamide, epoxy resin, alkyd resin, modified phenol-formaldehyde resin, modified urea-formaldehyde resin, modified melamine-formaldehyde resin, drying oil and cashew nut oil.

5. A method of producing a liquid and/or gas tight seal between two surfaces, comprising the steps of coating at least one of two opposite surfaces of a gasket with pressure-rupturable micro-capsules containing a sealing composition comprising a resin or rubber-like material which is liquid at normal ambient temperatures; positioning the coated gasket in facing relationship between said first mentioned two surfaces; and urging the said first mentioned two surfaces together thereby to rupture the micro-capsules and liberate the liquid sealing composition between the coated surface of the gasket and the first mentioned surface facing the coated surface.

* * * * *